United States Patent
Gopalan et al.

(10) Patent No.: US 10,253,127 B2
(45) Date of Patent: *Apr. 9, 2019

(54) COMPOSITION INCLUDING SILANE-GRAFTED POLYOLEFIN

(71) Applicant: Cooper-Standard Automotive, Inc., Novi, MI (US)

(72) Inventors: Krishnamachari Gopalan, Troy, MI (US); Robert J. Lenhart, Fort Wayne, IN (US); Gending Ji, Waterloo (CA)

(73) Assignee: Cooper-Standard Automotive, Inc., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,919

(22) Filed: May 14, 2018

(65) Prior Publication Data

US 2018/0258208 A1  Sep. 13, 2018

Related U.S. Application Data

(63) Continuation of application No. 14/305,918, filed on Jun. 16, 2014, now Pat. No. 10,040,888.

(60) Provisional application No. 61/835,157, filed on Jun. 14, 2013.

(51) Int. Cl.
 C08F 255/00 (2006.01)
(52) U.S. Cl.
 CPC ................... C08F 255/00 (2013.01)
(58) Field of Classification Search
 None
 See application file for complete search history.

(56) References Cited

U.S. PATENT DOCUMENTS

| | | |
|---|---|---|
| 3,682,201 A | 8/1972 | Atwell et al. |
| 4,076,698 A | 2/1978 | Anderson et al. |
| 4,412,942 A | 10/1983 | Matsuura et al. |
| 4,419,844 A | 12/1983 | Kreisfeld |
| 4,618,654 A | 10/1986 | Schmidtchen et al. |
| 4,798,864 A | 1/1989 | Topcik |
| 4,803,244 A | 2/1989 | Umpleby |
| 4,806,594 A | 2/1989 | Gross et al. |
| 4,818,789 A | 4/1989 | Tomko et al. |
| 4,894,281 A | 1/1990 | Yagi et al. |
| 4,927,184 A | 5/1990 | Bourjot et al. |

(Continued)

FOREIGN PATENT DOCUMENTS

| | | |
|---|---|---|
| EP | 0913427 A1 | 6/1999 |
| EP | 0920876 A2 | 6/1999 |

(Continued)

OTHER PUBLICATIONS

European Patent Office, "International Search Report and the Written Opinion of the International Searching Authority," PCT Application No. PCT/US2017/065442, dated Mar. 16, 2018 (10 pages).

(Continued)

*Primary Examiner* — Robert S Loewe

(57) ABSTRACT

A silane-grafted polyolefin composition is disclosed, and includes a desired reduced specific weight material. The composition finds application in a wide array of uses, and in particular automotive and uses such as weatherstrips, where this composition is used in place of conventional materials such as TPV and EPDM rubber formulations.

20 Claims, 4 Drawing Sheets

(56) References Cited

U.S. PATENT DOCUMENTS

| | | | |
|---|---|---|---|
| 5,145,628 A | 9/1992 | Karg et al. | |
| 5,252,660 A | 10/1993 | Hazan et al. | |
| 5,266,627 A | 11/1993 | Meverden et al. | |
| 5,272,236 A | 12/1993 | Lai et al. | |
| 5,741,858 A | 4/1998 | Brann et al. | |
| 5,814,254 A | 9/1998 | Bisconti | |
| 5,824,718 A | 10/1998 | Penfold et al. | |
| 5,837,174 A | 11/1998 | Bisconti | |
| 5,868,981 A | 2/1999 | Bisconti | |
| 5,883,144 A | 3/1999 | Bambara et al. | |
| 5,974,694 A | 11/1999 | Vecchiola | |
| 5,994,474 A * | 11/1999 | Wey | C09J 151/06 525/288 |
| 6,048,935 A * | 4/2000 | Penfold | C08F 255/02 522/120 |
| 6,068,026 A | 5/2000 | Garois | |
| 6,235,848 B1 * | 5/2001 | Bickert | C08F 255/00 523/212 |
| 6,316,512 B1 | 11/2001 | Bambara et al. | |
| 6,361,842 B1 | 3/2002 | Stachowiak | |
| 6,395,791 B1 | 5/2002 | Chaudhary et al. | |
| 6,399,708 B2 | 6/2002 | Valligny et al. | |
| 6,476,132 B1 | 11/2002 | Abdou-Sabet et al. | |
| 6,794,453 B2 | 9/2004 | Jackson et al. | |
| 6,828,011 B2 | 12/2004 | Yu et al. | |
| 6,864,315 B1 * | 3/2005 | Hakuta | C08K 5/0025 525/105 |
| 7,041,744 B2 | 5/2006 | Palmlof et al. | |
| 7,279,529 B2 | 10/2007 | Hogge et al. | |
| 7,281,547 B2 | 10/2007 | Cleveland et al. | |
| 7,834,115 B2 | 11/2010 | Johansson et al. | |
| 8,017,710 B2 | 9/2011 | Sultan et al. | |
| 8,205,391 B2 | 6/2012 | Aritake et al. | |
| 8,299,166 B2 | 10/2012 | Carlsson | |
| 8,318,864 B2 | 11/2012 | Harris et al. | |
| 8,387,625 B2 | 3/2013 | Kawata et al. | |
| 8,652,937 B2 | 2/2014 | Alan et al. | |
| 8,728,600 B1 | 5/2014 | Hayes | |
| 8,835,548 B2 | 9/2014 | Esseghir et al. | |
| 9,115,620 B2 | 8/2015 | Doneva et al. | |
| 9,127,110 B2 | 9/2015 | Sugita et al. | |
| 9,387,625 B2 | 7/2016 | Esseghir et al. | |
| 2004/0006179 A1 | 1/2004 | Graf | |
| 2004/0045619 A1 | 3/2004 | Backman et al. | |
| 2004/0103948 A1 | 6/2004 | Scheelen et al. | |
| 2004/0157053 A1 * | 8/2004 | Yu | B29C 47/0004 428/332 |
| 2004/0265524 A1 | 12/2004 | Wideman et al. | |
| 2004/0265563 A1 * | 12/2004 | Sakai | B29C 44/352 428/315.7 |
| 2006/0185750 A1 | 8/2006 | Mestemacher | |
| 2007/0027250 A1 | 2/2007 | Joseph et al. | |
| 2007/0122570 A1 * | 5/2007 | Honda | B32B 27/32 428/31 |
| 2008/0023215 A1 * | 1/2008 | Uehara | C08F 255/02 174/137 B |
| 2008/0097038 A1 | 4/2008 | Biscoglio et al. | |
| 2008/0306217 A1 * | 12/2008 | Karjala | C08F 10/00 525/207 |
| 2008/0314470 A1 | 12/2008 | Trace et al. | |
| 2009/0143531 A1 * | 6/2009 | Ouhadi | C08F 8/00 525/69 |
| 2010/0209705 A1 * | 8/2010 | Lin | C08F 255/02 428/391 |
| 2010/0249256 A1 | 9/2010 | Moscardi et al. | |
| 2011/0144277 A1 | 6/2011 | Weissenbach et al. | |
| 2011/0144278 A1 | 6/2011 | Weissenbach et al. | |
| 2011/0146792 A1 | 6/2011 | Wu et al. | |
| 2011/0172367 A1 | 7/2011 | Backer et al. | |
| 2011/0259464 A1 | 10/2011 | Lacroix et al. | |
| 2012/0042980 A1 | 2/2012 | Mezzalira et al. | |
| 2012/0145275 A1 | 6/2012 | Seebold et al. | |
| 2012/0171496 A1 | 7/2012 | Esseghir et al. | |
| 2012/0178867 A1 | 7/2012 | Esseghir et al. | |
| 2012/0312581 A1 | 12/2012 | Yasuda et al. | |
| 2014/0191161 A1 * | 7/2014 | Amako | C08G 77/12 252/301.36 |
| 2015/0047264 A1 | 2/2015 | Kobayashi | |
| 2016/0174655 A1 | 6/2016 | Schiller et al. | |
| 2016/0208060 A1 | 7/2016 | Nishiguchi et al. | |
| 2016/0251535 A1 | 9/2016 | Chaudhary et al. | |
| 2017/0130876 A1 | 5/2017 | Gopalan et al. | |

FOREIGN PATENT DOCUMENTS

| | | |
|---|---|---|
| EP | 0944670 B1 | 4/2003 |
| EP | 1820821 A1 | 8/2007 |
| EP | 2083047 A1 | 7/2009 |
| EP | 2143984 A1 | 1/2010 |
| EP | 2407496 A1 | 1/2012 |
| EP | 2520422 A1 | 11/2012 |
| EP | 2546291 A1 | 1/2013 |
| EP | 2395878 B1 | 4/2013 |
| JP | 2013119583 A | 6/2013 |
| WO | 9001503 | 2/1990 |
| WO | 2004031292 A2 | 4/2004 |
| WO | 2005005532 A1 | 1/2005 |
| WO | 2010074916 A1 | 7/2010 |
| WO | 2013134945 A1 | 9/2013 |
| WO | 2015054893 A1 | 4/2015 |
| WO | 2015126931 A1 | 8/2015 |
| WO | 2016004204 A1 | 1/2016 |

OTHER PUBLICATIONS

European Patent Office, "International Search Report and the Written Opinion of the International Searching Authority," PCT Application No. PCT/US2017/065451, dated Mar. 16, 2018 (10 pages).
European Patent Office, "International Search Report and the Written Opinion of the International Searching Authority," PCT Application No. PCT/US2017/065463, dated Mar. 16, 2018 (10 pages).
European Patent Office, "International Search Report and the Written Opinion of the International Searching Authority," PCT Application No. PCT/US2017/065360, dated Mar. 26, 2018 (11 pages).
European Patent Office, "International Search Report and the Written Opinion of the International Searching Authority," PCT Application No. PCT/US2017/065376, dated Feb. 22, 2018 (11 pages).
European Patent Office, "International Search Report and the Written Opinion of the International Searching Authority," PCT Application No. PCT/US2017/065386, dated Mar. 22, 2018 (11 pages).
Adachi et al., Controllable Sllane Water-Cross-Linking Kinetics and Curability of Ethylene-Propylene Copolymer by Amine Compounds, Industrial and Engineering Chemistry Research, 47, 2008, 1812-1819.
Dow Corning, Plastics, Polymerization and Rubber, 2009, 5 pages.
Morshedian et al., Silane grafting of polyethylene: effect of molecular structure, physical form, blending, and antioxidants, e-Polymers, No. 24, 2009, 1-17.
Why Use Silane Crosslinking Technology, Jun. 8, 2012, <https://wenku.baidu.com/view/3454a9a7b0717fd5360cdcb4>.
International Searching Authority, International Search Report and Written Opinion for International Application No. PCT/US2015/038830, dated Sep. 23, 2015, 12 pages.
International Searching Authority; Search Report and Written Opinion of the International Searching Authority in International Application No. PCT/US2017/065459; dated May 25, 2018; 17 pages; Rijswijk, Netherlands.
International Searching Authority; Search Report and Written Opinion of the International Searching Authority in International Application No. PCT/US2017/065404; dated Mar. 16, 2018; 10 pages; Rijswijk, Netherlands.

* cited by examiner

COMPOSITION INCLUDING SILANE-GRAFTED POLYOLEFIN

CROSS-REFERENCE TO RELATED APPLICATIONS

This application is a continuation application that claims priority to and the benefit under 35 U.S.C. § 120 of U.S. patent application Ser. No. 14/305,918 filed on Jun. 16, 2014, entitled "COMPOSITION INCLUDING SILANE-GRAFTED POLYOLEFIN," which claims the priority benefit under 35 U.S.C. § 119(e) of U.S. Provisional Patent Application No. 61/835,157, filed Jun. 14, 2013, entitled "WEATHERSTRIP COMPOSITION," the disclosures of which are expressly incorporated by reference herein in their entirety.

BACKGROUND

The present disclosure relates to compositions such as weatherstrip compositions, weatherstrips that may be used in vehicles, and methods for forming the compositions and/or weatherstrips.

It is common in the motor vehicle industry to fashion decorative abrasion resistant sections for various parts of an automobile by extruding such sections from certain polymeric materials. Examples of typical abrasion resistant sections manufactured by such a process include weatherstrips. These weatherstrips are mounted on an automobile door surface and along the perimeter of automobile doors to provide a seal between the door and the automobile body as well as to protect both the door and exterior objects when they come in contact with each other. The weatherstrips may prevent wind noise, water leaks, and dust from entering the automobile.

Automotive glass run weatherstrip formulations typically utilize either thermoplastic vulcanizates (TPV) or ethylene propylene diene monomer (EPDM) rubber to achieve desired performance. TPVs are relatively easy to process but performance can be limited and material costs tend to be high. EPDM rubber formulations can require many ingredients (e.g., carbon black, petroleum-based oil, zinc oxide, miscellaneous fillers such as calcium carbonate or talc, processing aids, curatives, blowing agents, and many other materials to meet performance requirements). These ingredients are typically mixed together in a one or two step process prior to shipping to an extrusion facility. At the extrusion facility, the ingredients and rubber compound(s) are extruded into automotive glass run weatherstrips.

The extrusion process can include many stages depending on the type of EPDM weatherstrip being manufactured. For example, extrusion lines of up to 80 yards in length that are powered by natural gas and/or electricity may be required. Much of the natural gas and/or electricity is used to fuel hot air ovens, microwaves, infrared ovens, or other types of equipment used to vulcanize the EPDM rubber compounds. The vulcanization process also produces fumes that must be vented and monitored to comply with environmental requirements. This process can be very time consuming, costly, and environmentally unfriendly.

It would be desirable to develop new compositions and methods for manufacturing weatherstrips which are simpler, lighter in weight, have superior long-term load loss (LLS) (i.e., ability to seal the glass and window for a long term), and more environmentally friendly.

BRIEF SUMMARY

The present disclosure relates to compositions including silane-grafted polyolefins.

The compositions are useful in the production of weatherstrips, for example glass run weatherstrips for use in vehicles. The weatherstrips may be components of glass sealing systems with good surface appearance, good weathering, and good sealing capability against wind, noise, and water leaks.

Disclosed in embodiments is a weatherstrip comprising a silane-grafted polyolefin.

Disclosed in other embodiments is a method for manufacturing a composition that finds use as a weatherstrip. The method includes extruding a composition that contains a silane-grafted polyolefin. The extruded composition is molded into the shape of the weatherstrip. The method may further include grafting silanes to a polyolefin to form the silane-grafted polyolefin.

Disclosed in further embodiments is a composition comprising a silane-grafted polyolefin.

Disclosed in some embodiments is a weatherstrip composition. The weatherstrip composition consists of a silane-grafted polyolefin having a density of from about 0.84 g/cm$^3$ to about 0.96 g/cm$^3$; and one or more additives selected from the group consisting of polypropylenes, thermoplastic vulcanates (TPV), olefinic block copolymers, ethylene propylene diene terpolymers (EPDM), ethylene vinyl acetate (EVA) copolymers, ethylene n-butyl acrylate copolymers, and ethylene methacrylate copolymers. The polyolefin is selected from the group consisting of a blend of propylene/α-olefin copolymer with an ethylene/α-olefin copolymer, and a propylene/α-olefin copolymer.

Disclosed in other embodiments is a method for manufacturing a weatherstrip. The method consists of grafting silanes to a polyolefin to form a silane-grafted polyolefin; extruding a composition comprising the silane-grafted polyolefin having a density of from about 0.84 g/cm$^3$ to about 0.96 g/cm$^3$, a condensation catalyst, and optionally one or more fillers selected from the group consisting of polypropylenes, thermoplastic vulcanates (TPV), ethylene propylene diene terpolymers (EPDM), ethylene vinyl acetate (EVA) copolymers, ethylene n-butyl acrylate copolymers, and ethylene methacrylate copolymers; and molding the extruded composition into the weatherstrip. The polyolefin is selected from the group consisting of a blend of propylene/α-olefin copolymer with an ethylene/α-olefin copolymer, and a propylene/α-olefin copolymer.

Disclosed in still other embodiments is a weatherstrip comprising a weatherstrip composition. The weatherstrip composition comprises a silane-grafted polyolefin having a density of from about 0.84 g/cm$^3$ to about 0.96 g/cm$^3$. The polyolefin is a blend of propylene/α-olefin copolymer and an ethylene/α-olefin copolymer.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
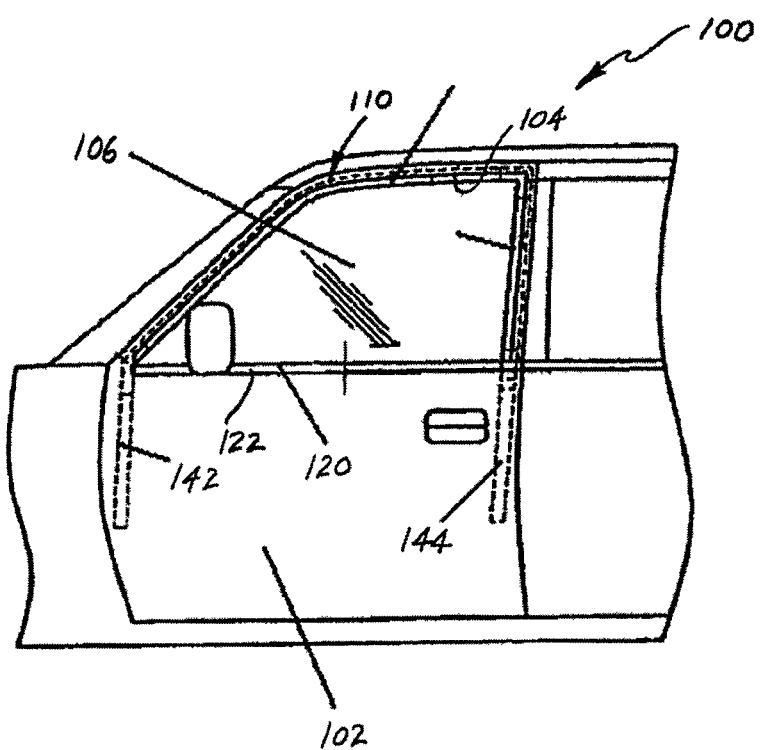
FIG. 1 is a side perspective view of a portion of an automotive vehicle.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

FIG. 1 shows a portion of an automotive vehicle 100 including a front door 102. The front door 102 includes a window opening 104 and a window 106 that can be selectively raised and lowered relative to the door. A weatherstrip 110 surrounds selective perimeter portions of the window (e.g., side and upper portions when the window is closed). This weatherstrip 110 may be a glass run weatherstrip. The weatherstrip 110 may be formed as separate weatherstrip portions that engage different perimeter portions of the window. In some embodiments, the weatherstrip portions are integrally joined together as a module or a single weatherstrip assembly.

A lower edge of the window opening, as defined by the door, may be referred to as a beltline 120. Extending along the beltline 120 is a beltline weatherstrip portion or beltline portion of the weatherstrip module identified as 122.

Figure 2:
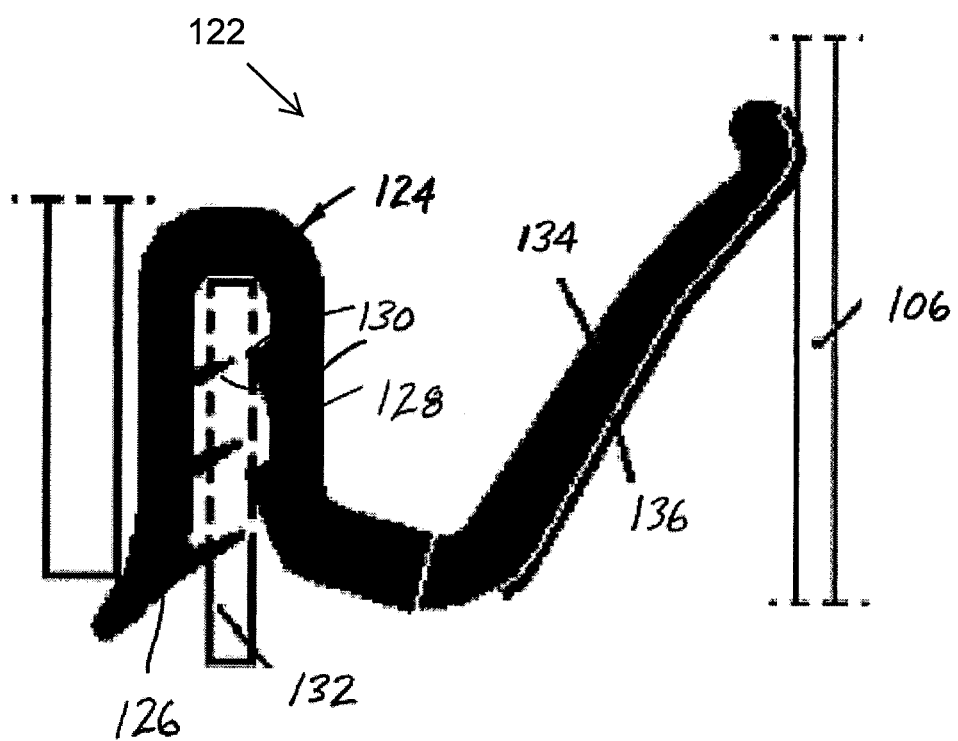
FIG. 2 is a cross-sectional view of a beltline weatherstrip portion.

A cross-sectional view of the beltline weatherstrip 122 is shown in FIG. 2. The beltline weatherstrip includes a body 124 formed as an inverted, generally U-shaped component in cross-section having first and second legs 126, 128 having inwardly extending gripping portions 130 that engage a door panel 132. The beltline weatherstrip 122 further includes a seal lip 134 that is flexible relative to the body, and is oftentimes formed of a different material (e.g., a lower durometer rubber or plastic) than the rubber or EPDM polymer composition of the body 124. A low friction material 136 is typically provided along that portion of the seal lip 134 that is configured for sliding engagement with the movable glass on the vehicle door window 106. It is not uncommon for the beltline weatherstrip 122 to be formed as a co-extruded structure where the different regions or portions of the integrated beltline weatherstrip are formed from different materials in order to serve different functions. For example, the body 124 may be a higher durometer material while the seal lip 134 requires flexibility and thus is preferably a lower durometer material that may also incorporate a low friction material.

Figure 3:
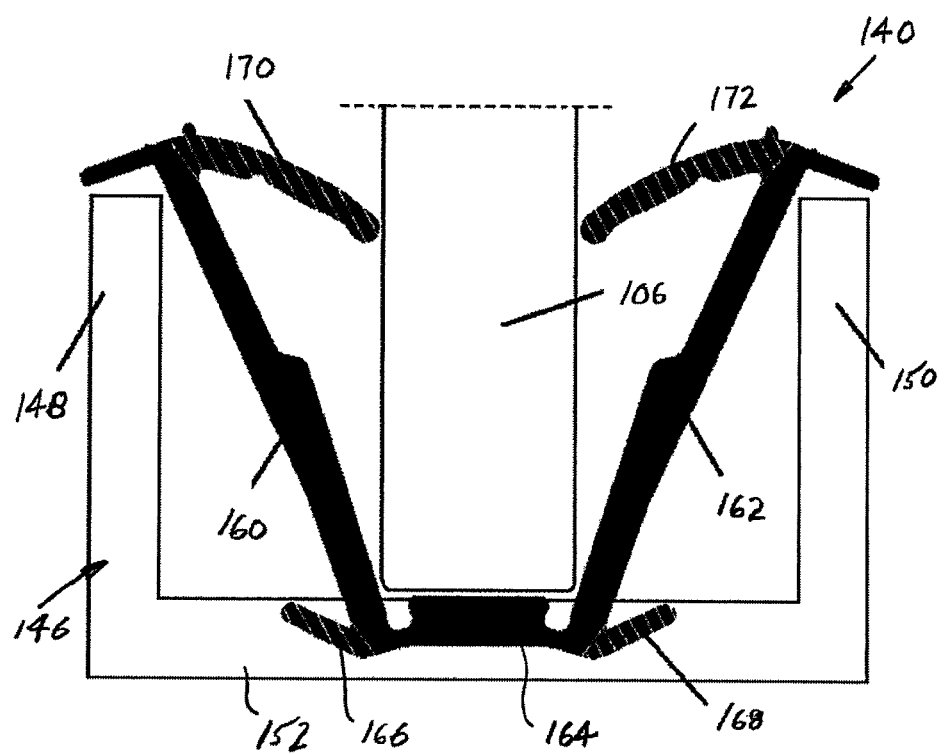
FIG. 3 is a cross-sectional view of a below belt weatherstrip portion.

Illustrated in FIG. 3 is a cross-sectional view of another or below belt weatherstrip portion 140 of the glassrun weatherstrip. For example, below belt portions 142, 144 located in an interior cavity of the door 102 may have a configuration as generally illustrated in FIG. 3. Specifically, the below belt weatherstrip portion has an outer rigid support member 146 shown here as a generally U-shaped component that receives or supports the below belt weatherstrip portion 140. Upstanding legs 148, 150 form a channel with base 152 that receives the weatherstrip portion 140. The weatherstrip portion 140 is unsupported, i.e., it does not have a rigid support member encased within the rubber or EPDM polymer of which the weatherstrip portion is made. First and second legs 160, 162 extend generally upwardly and outwardly from a base portion 164 so that this below belt weatherstrip portion 140 likewise has a generally U-shaped conformation adapted to receive a perimeter edge of the window 106. Retaining flanges 166, 168 are provided along outer edges of the base portion 164 while flexible seal lips 170, 172 are flexibly joined at outer ends of the respective legs 160, 162. Again, the flexible seal lips 170, 172, and even the retaining flanges 166, 168 may be formed of a different material than the remaining rubber of the weatherstrip portion 140. Further, those portions of the body (comprised of legs 160, 162 and base 164) that are adapted to engage the window 106 preferably have a hardened surface, while the seal lips 170, 172 may have a low friction surface where the seal lips engage the window edge.

The weatherstrips are formed from a composition including a silane-grafted polyolefin. The silane-grafted polyolefin may be a silane-grafted polyolefin elastomer. The silane-grafted polyolefin may be cross-linked upon exposure to moisture and/or heat to form an elastomeric material. The cross-linked polyolefin can be used in place of existing TPV and EPDM rubber formulations to manufacture, for example, automotive weatherstrips.

Advantageously, the compositions may require a limited number of ingredients (e.g., 10, 9, 8, 7, 6, 5, 4, or 3 ingredients). The ingredients may be combined at an extruder during extrusion (e.g., a single-step Monosil process or a two-step Sioplas process), thereby eliminating the need for additional steps of mixing and shipping rubber compounds prior to extrusion.

Figure 4:
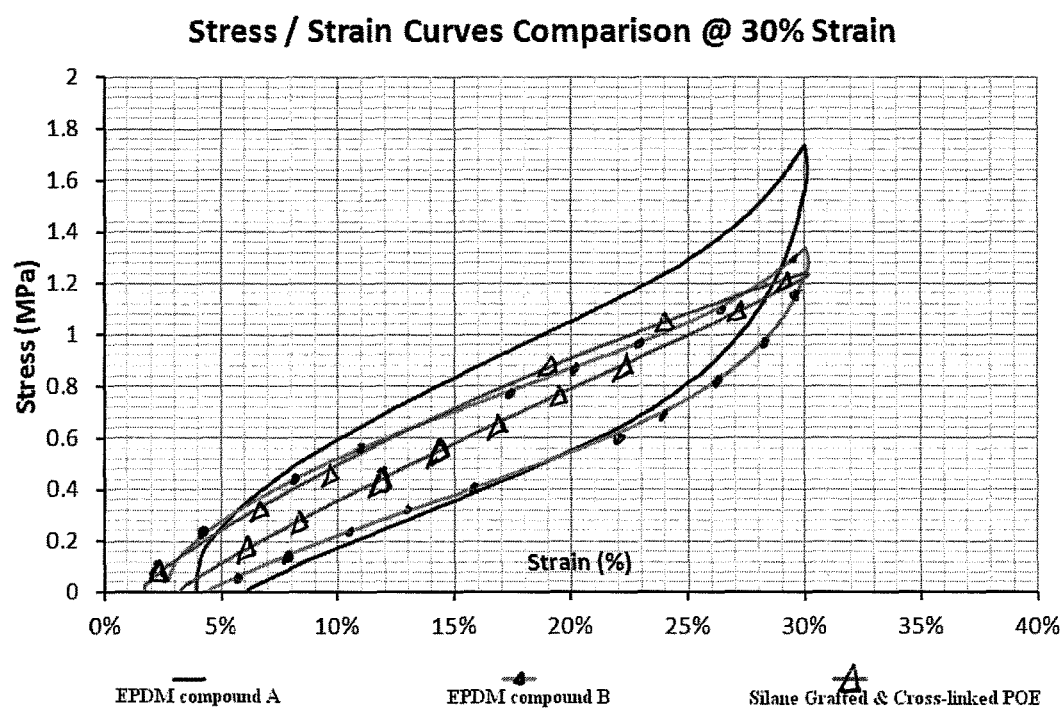
FIG. 4 is a graph illustrating the stress/strain behavior of a composition of the present disclosure compared to two EPDM compounds.

FIG. 4 illustrates the superior stress/strain behavior of an exemplary material of the present disclosure relative to two existing EPDM materials. In particular, FIG. 4 displays a smaller area between the stress/strain curves for the silane-grafted and cross-linked polyolefin, versus the areas between the stress/strain curves for EPDM compound A and EPDM compound B. This can be desirable for most automotive glass run weatherstrip applications. Elastomeric materials typically have non-linear stress-strain curves with a significant loss of energy when repeatedly stressed. The compositions of the present disclosure may exhibit greater elasticity (e.g., have linear curves and exhibit very low energy loss).

The compositions of the present disclosure also reduce the carbon footprint of extrusion plants used to make the weatherstrips or other articles because large natural gas and/or electrical ovens may not be required for vulcanization. Instead, more efficient low pressure steam chambers can be utilized to vulcanize the silane-grafted polyolefin with minimal fume evolution. In some embodiments, the compositions of the present disclosure are curable at room temperature (e.g., at a humidity of at least 55%). Cure times may be reduced at higher temperatures and/or higher pressures.

The specific gravity of the silane-grafted and cross-linked polyolefins of the present disclosure may be lower than the specific gravities of existing TPV and EPDM formulations. The reduced specific gravity of the materials leads to lower weight parts, thereby helping automakers meet increasing demands for improved fuel economy. For example, the specific gravity of a representative material of the present disclosure may be from about 0.86 g/cm$^3$ to about 0.96 g/cm$^3$ as compared to presently used materials such as TPV which may have a specific gravity of from 0.95 to 1.2 g/cm$^3$ and EPDM which may gave a specific gravity of from 1.0 to 1.35 g/cm$^3$.

The polyolefin elastomer may be a block copolymer, an ethylene/α-olefin copolymer, a propylene/α-olefin copolymer, EPDM, or a mixture of two or more of any of these materials. Exemplary block copolymers include those sold under the trade names INFUSE™ (the Dow Chemical Company) and SEPTON™ V-SERIES (Kuraray Co., LTD.). Exemplary ethylene/α-olefin copolymers include those sold under the trade names VISTAMAXX™ (e.g., VISTAMAXX 6102) (Exxon Mobil Chemical Company), TAFMER™ (e.g., TAFMER DF710) (Mitsui Chemicals, Inc.), and ENGAGE™ (e.g., ENGAGE 8150) (the Dow Chemical Company). Exemplary propylene/α-olefin copolymers TAFMER™ XM grades (Exxon Mobil Chemical Company). The EPDM may have a diene content of from about 0.5 to about 10 weight percent In some embodiments, the polyolefin is selected from the group consisting of: homopolymers of an olefin or a blend of homopolymers, copolymers of two or more olefins or a blend of copolymers, and a blend of homopolymers with copolymers The olefin may be selected from ethylene, propylene, 1-butene, 1-propene, 1-hexene, and 1-octene. The polyolefin may be produced by any process (e.g., using gas phase and solution based using metallocene catalysis and Ziegler-Natta catalysis) and optionally using any catalyst suitable for polymerizing ethylene and α-olefins. A metallocene catalyst may be used to produce low density ethylene/α-olefin polymers.

Suitable polyethylenes include but are not limited to polyethylene obtained by homopolymerization of ethylene or copolymerization of ethylene and a higher 1-olefin comonomer.

Suitable polypropylenes include but are not limited to polypropylene obtained by homopolymerization of propylene or copolymerization of propylene and an olefin comonomer.

The term "comonomer" refers to olefin comonomers which are suitable for being polymerized with olefin monomers, such as ethylene or propylene monomers. Comonomers may comprise but are not limited to aliphatic $C_2$-$C_{20}$ α-olefins. Examples of suitable aliphatic $C_2$-$C_{20}$ α-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the comonomer is vinyl acetate. The term "copolymer" refers to a polymer, which is made by linking more than one type of monomer in the same polymer chain. The term "homopolymer" refers to a polymer which is made by linking olefin monomers, in the absence of comonomers. The amount of comonomer can, in some embodiments, be from greater than 0 to about 12 weight percent based on the weight of the polyolefin, including from greater than 0 to about 9 weight percent and from greater than 0 to about 7 weight percent. In some embodiments, the comonomer content is greater than about 2 mole percent of the final polymer, including greater than about 3 mole percent and greater than about 6 mole percent. The comonomer content may be less than or equal to about 30 mole percent. A copolymer can be a random or block (heterophasic) copolymer. In some embodiments, the polyolefin is a random copolymer of propylene and ethylene.

The polyethylene for use in the present disclosure can be classified into several types including, but not limited to, LDPE (Low Density Polyethylene), LLDPE (Linear Low Density Polyethylene), and HDPE (High Density Polyethylene). In another classification, the polyethylene can be classified as Ultra High Molecular Weight (UHMW), High Molecular Weight (HMW), Medium Molecular Weight (MMW) and Low Molecular Weight (LMW). The polyethylene may be an ultra-low density ethylene elastomer. The ultra-low density ethylene elastomer may have a density of 0.85 g/cm$^3$ or greater, including from about 0.88 to about 0.92 g/cm$^3$.

The polyolefin may include a LDPE/silane copolymer or blend.

The polyolefin, such as polyethylene, can be produced using any catalyst known in the art including, but not limited to, chromium catalysts, Ziegler-Natta catalysts, metallocene catalysts or post-metallocene catalysts.

In some embodiments, the polyolefin has a molecular weight distribution $M_w/M_n$ of less than or equal to about 5, including less than or equal to about 4, from about 1 to about 3.5, and from about 1 to about 3.

The polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some embodiments, the polyolefin has a fractional melt index of from 0.5 g/10 min to about 3,500 g/10 min.

The polyolefin may be polymerized in two reactors, wherein a first polymer is polymerized in the first reactor and a second polymer is polymerized in the second reactor. The second polymer may be of a higher molecular weight, a different density, and/or be heterogeneous. The reactors may be connected in series or in parallel.

In some embodiments, a blend of two or more polyolefins is silanated and/or cured. The blend may include an ethylene/α-olefin polymer and a propylene/α-olefin polymer.

The polymers and resins of the present disclosure may be treated with one or more stabilizers (e.g., antioxidants). The polymers may be treated before grafting, after grafting, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 weight percent, including less than 0.2 weight percent of the composition.

In some embodiments, the density of the polyolefin elastomer is less than 1.0 g/cm$^3$, including less than about 0.92 g/cm$^3$. The density may be from about 0.85 g/cm$^3$ to about 0.96 g/cm$^3$. In some embodiments, the density is at least 0.84 g/cm$^3$, including at least about 0.862 g/cm$^3$.

The polyolefin elastomer may be present in an amount of from greater than 0 to about 100 weight percent of the composition. In some embodiments, the amount of polyolefin elastomer is from about 30 to about 70 weight percent.

The percent crystallinity of the polyolefin elastomer may be less than about 40%, less than about 35%, less than about 30%, less than about 25%, or less than about 20%. The percent crystallinity may be at least about 10%. In some embodiments, the crystallinity is in the range of from about 2% to about 60%.

The silane grafted to the polyolefin may be selected from alkoxysilanes, silazanes and siloxanes.

Non-limiting examples of silazanes include hexamethyldisilazane (HMDS or Bis(trimethylsilyl)amine). Non-limiting examples of siloxane compounds include polydimethylsiloxane (PDMS) and octamethylcyclotetrasiloxane.

In some embodiments, the silane is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —NH$_2$, —NHCH$_3$ or —N(CH$_3$)$_2$; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxy-propyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl trimethoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine; N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycysil)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl)undecanol; triethoxysilyl undecanol; ethylene glycol acetal; and N-(3-ethoxysilylpropyl)gluconamide.

The alkylsilane may be expressed with a general formula: R$_n$Si(OR')$_4$-n wherein: n is 1, 2 or 3; R is a C$_{1-20}$ alkyl; and R' is an C$_{1-20}$ alkyl.

The term "alkyl" by itself or as part of another substituent, refers to a straight or branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, C$_{1-6}$ alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers.

The term "C$_{2-20}$ alkenyl" by itself or as part of another substituent, refers to an unsaturated hydrocarbyl group, which may be linear, or branched, comprising one or more carbon-carbon double bonds having 2 to 20 carbon atoms. Examples of C$_{2-6}$ alkenyl groups are ethenyl, 2-propenyl, 2-butenyl, 3-butenyl, 2-pentenyl and its isomers, 2-hexenyl and its isomers, 2,4-pentadienyl and the like.

An alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane;

hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane.

The silane compound may be selected from triethoxyoctylsilane, trimethoxyoctylsilane, and a combination thereof.

Examples of silanes include, but are not limited to, those of the general formula $CH_2=CR-(COO)_x(CnH_{2n})_ySiR'_3$, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some embodiments, no more than one of the three R' groups is an alkyl. In other embodiments, not more than two of the three R' groups is an alkyl.

Any silane or mixture of silanes that can effectively graft to and crosslink an olefin polymer can be used in the practice of the present disclosure. Suitable silanes include, but are not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups. In some embodiments, the silanes are unsaturated alkoxy silanes which can be grafted onto the polymer. Other exemplary silanes include vinyltrimethoxysilane, vinyltriethoxysilane, 3-(trimethoxysilyl)propyl methacrylate gamma-(meth)acryloxypropyl trimethoxysilane), and mixtures thereof.

The silane may be present in the silane-grafted polyolefin in an amount of from greater than 0 to about 10 weight percent, including from about 0.5 to about 5 weight percent. The amount of silane may be varied based on the nature of the olefin polymer, the silane, the processing conditions, the grafting efficiency, the application, and other factors. The amount of silane may be at least 2 weight percent, including at least 4 weight percent or at least 5 weight percent, based on the weight of the reactive composition. In other embodiments, the amount of silane may be at least 10 weight percent, based on the weight of the reactive composition. In some embodiments, the silane content is at least 1% based on the weight of the reactive composition.

Optionally, the crosslinking is initiated by a catalyst or electron beam radiation. Non limiting examples of catalysts include organic bases, carboxylic acids, and organometallic compounds (e.g., organic titanates and complexes or carboxylates of lead, cobalt, iron, nickel, zinc, and tin). The catalyst may be selected from fatty acids and metal complex compounds such as metal carboxylates; aluminum triacetyl acetonate, iron triacetyl acetonate, manganese tetraacetyl acetonate, nickel tetraacetyl acetonate, chromium hexaacetyl acetonate, titanium tetraacetyl acetonate and cobalt tetraacetyl acetonate; metal alkoxides such as aluminum ethoxide, aluminum propoxide, aluminum butoxide, titanium ethoxide, titanium propoxide and titanium butoxide; metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate); acidic compounds such as formic acid, acetic acid, propionic acid, p-toluenesulfonic acid, trichloroacetic acid, phosphoric acid, monoalkylphosphoric acid, dialkylphosphoric acid, phosphate ester of p-hydroxyethyl (meth)acrylate, monoalkylphosphorous acid and dialkylphosphorous acid; acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts or polyvalent metal salts of these acids, sodium hydroxide, lithium chloride; organometal compounds such as diethyl zinc and tetra(n-butoxy)titanium; and amines such as dicyclohexylamine, triethylamine, N,N-dimethylbenzylamine, N,N,N',N'-tetramethyl-1,3-butanediamine, diethanolamine, triethanolamine and cyclohexylethylamine. In some embodiments, the catalyst is selected from ibutyltindilaurate, dioctyltinmaleate, dibutyltindiacetate, dibutyltindioctoate, stannous acetate, stannous octoate, lead naphthenate, zinc caprylate, and cobalt naphthenate. A single catalyst or a mixture of catalysts may be utilized. The catalyst(s) may be present in an amount of from about 0.01 weight percent to about 1.0 weight percent, including from about 0.25 to about 8 weight percent, based on the total weight of the composition.

In some embodiments, the crosslinking system uses a combination of radiation, heat, moisture, and crosslinking agent(s). The crosslinking agent(s) may be present in an amount of from 0.25 to 8 weight percent.

Optionally, a grafting initiator is utilized in the grafting process. The grafting initiator may be selected from halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy)hexyne-3, 1,3-bis(t-butyl-peroxy-isopropyl) benzene, n-butyl-4,4-bis(t-butyl-peroxy)valerate, benzoyl peroxide, t-butylperoxybenzoate, t-butylperoxy isopropyl carbonate, and t-butylperbenzoate, as well as bis(2-methylbenzoyl)peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butyl pexoxy)-1,4-diisopropyl benzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (available from Arkema, Inc.).

In some embodiments, the grafting initiator is present in an amount of from greater than 0 to about 2 weight percent of the composition, including from about 0.15 to about 1.2 weight percent of the composition. The amount of initiator and silane employed may affect the final structure of the silane grafted polymer (e.g., the degree of grafting in the grafted polymer and the degree of crosslinking in the cured polymer). In some embodiments, the reactive composition contains at least 100 ppm of initiator or at least 300 ppm of initiator. The initiator may be present in an amount from 300 ppm to 1500 ppm or 2000 ppm. The silane:initiator weight ratio may be from about 20:1 to 400:1, including from about 30:1 to about 400:1 and from about 48:1 to about 350:1 and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in the melt, in solution, in the solid-state, and/or in a swollen-state. The silanation may be performed in a wide-variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature (i.e., the temperature at which the polymer starts melting and starts to flow) may be from about 120° C. to about 260° C., including from about 130° C. to about 250° C.

The composition optionally includes one or more fillers. The filler(s) may be extruded with the silane-grafted polyolefin. The filler(s) may be selected from metal oxides, metal hydroxides, metal carbonates, metal sulfates, metal silicates, clays, talcs, carbon black, and silicas. These materials may be fumed or calcined.

The metal of the metal oxide, metal hydroxide, metal carbonate, metal sulfate, or metal silicate may be selected from alkali metals (e.g., lithium, sodium, potassium, rubidium, caesium, and francium); alkaline earth metals (e.g., beryllium, magnesium, calcium, strontium, barium, and radium); transition metals (e.g., zinc, molybdenum, cadmium, scandium, titanium, vanadium, chromium, manganese, iron, cobalt, nickel, copper, yttrium, zirconium, niobium, technetium, ruthernium, rhodium, palladium, silver, hafnium, taltalum, tungsten, rhenium, osmium, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, Cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, neptunium, plutonium, americium, curium, berkelium, californium, einsteinium, fermium, mendelevium, nobelium, and lawrencium); germanium; arsenic; antimony; and astatine.

The filler(s) may be present in an amount of from greater than 0 to about 50 weight percent, including from about 1 to about 20 weight percent and from about 3 to about 10 weight percent.

One stage silane crosslinking can involve the extrusion of a direct mixture of the polymer resin with a silane concentrate that includes a catalyst. The extrudate can be subsequently cross-linked in the presence of moisture/heat. In two-stage crosslinking, silane is first grafted to the polymer molecular chains according to known reactions to yield a silane grafted copolymer.

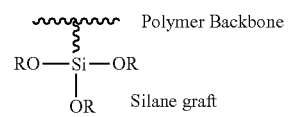

Subsequently, the silane-grafted copolymer is mixed with a silanol forming condensation catalyst and then exposed to humidity and/or heat to effect crosslinking of the copolymer in a two-step reaction. Alternatively, the composition can be cross-linked via 'Ambicat' where the ambient moisture is sufficient to crosslink over a longer time period (e.g., about 48 hours). First, the water hydrolyzes the silane to produce a silanol. The silanol then condenses to form intermolecular, irreversible Si—O—Si crosslink sites.

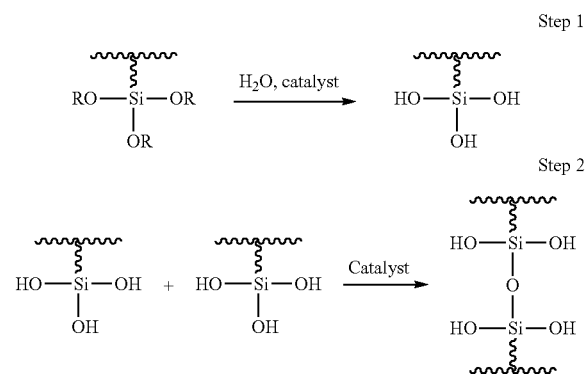

The amount of cross-linked silane groups, and thus the final polymer properties, can be regulated by controlling the production process, including the amount of catalyst used. A gel test (ASTM D2765) can be used to determine the amount of crosslinking.

Curing may occur over a time period of from greater than 0 to about 20 hours. In some embodiments, curing takes place over a time period of from about 1 to about 8 hours, including from about 3 to about 6 hours.

The temperature during curing may be from about 50 to about 150'C, including from about 80 to about 100° C. and from about 85 to about 95° C.

The humidity during curing may be from about 30 to about 100% including from about 40 to about 100% and from about 50 to about 100%.

The number average molecular weight of the grafted polymers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Optionally, the compositions and/or articles formed therefrom further include one or more TPVs and/or EPDM with or without silane graft moieties. In some embodiments, the compositions and/or articles further include other homopolymers, copolymers, and/or terpolymers of ethylene (e.g., LDPE, grafted polymers, maleated polymers, EVA copolymers, ethylene n-butyl acrylate copolymers, and ethylene methacrylate copolymers); homopolymers, copolymers, and/or terpolymers of propylene; rubbery block copolymers (e.g., copolymers having A-B-A configurations, A-B-A-B-A-B configurations, A-B configurations, and radial block copolymers); and other olefin-based polymers. In some embodiments, the additional polymers are present in an amount of up to 20 weight percent of the composition.

The compositions and/or articles may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes).

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included. The tackifying resins may have a ring and ball softening point in the range of from 70° C. to about 150° C. and a viscosity of less than about 3,000 cP at 177° C.

The compositions may include one or more oils. Non-limiting types of oils include white mineral oils and naphthenic oils.

The compositions may be extruded into pellets, pillows, or any other configuration prior to the formation of the final article.

Non-limiting examples of articles the compositions may be used to manufacture include weather seals such as static seals (e.g., glass run channels) including molded details/corners, dynamic seals (e.g., primary and secondary body and door seals, other body closure seals, including hood-to-cowl, lift gate, etc.), sunroof seals, convertible top seals, mirror seals, body-panel interface seals, stationary window moldings, glass encapsulations, cut-line seals, greenhouse moldings, occupation detector system sensor switches, rocker seals, outer and inner belts, auxiliary and margin seals, edge protector/gimp seals, and below-belt brackets and channels; automotive hoses such as coolant hoses, air conditioning hoses, and vacuum hoses; anti-vibration system (AVS) components such as mounts (e.g., engine, body, accessory, component), dampers, bushings, strut mounts, and isolators; coatings such as coatings for brake lines, fuel lines, transmission oil cooler lines, brackets, cross members, frame components, body panels and components, suspension components, wheels, hubs, springs, and fasteners; air deflectors, spoilers, fascia, and trim; building, window, and door seals; boots, bellows, and grommets; gaskets (e.g., pneumatic and/or hydraulic gaskets); wire and cable sheathing; tires; windshield wipers and squeegees; floor mats; pedal covers; automotive belts; conveyor belts; shoe components; marine bumpers; O-rings; valves and seals; and springs (e.g., as substitutes for mechanical metal springs).

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements, components, or materials that do not differ from the literal language of the claims, or if they include equivalent structural elements, components, or materials with insubstantial differences from the literal language of the claims. The above examples are merely illustrative of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", includes", "having", "has", "with", or variants thereof are used in the detailed description and/or in the claims, such terms are intended to be inclusive in a manner similar to the term "comprising. Moreover, this disclosure is intended to seek protection for a combination of components and/or steps and a combination of claims as originally presented for examination, as well as seek potential protection for other combinations of components and/or steps and combinations of claims during prosecution.

The invention claimed is:

1. A weatherstrip consisting essentially of a weatherstrip composition, the weatherstrip composition consisting of:
 a silane-grafted polyolefin having a density of from about 0.84 g/cm$^3$ to about 0.96 g/cm$^3$; and
 one or more additives selected from the group consisting of polypropylenes, thermoplastic vulcanates (TPV), olefinic block copolymers, ethylene propylene diene terpolymers (EPDM), ethylene vinyl acetate (EVA) copolymers, ethylene n-butyl acrylate copolymers, and ethylene methacrylate copolymers;
 wherein the polyolefin is selected from the group consisting of a blend of propylene/α-olefin copolymer with an ethylene/α-olefin copolymer, and a propylene/α-olefin copolymer.

2. A method for manufacturing a weatherstrip, comprising:
 grafting silanes to a polyolefin to form a silane-grafted polyolefin;
 extruding a composition comprising the silane-grafted polyolefin having a density of from about 0.84 g/cm$^3$ to about 0.96 g/cm$^3$, a condensation catalyst, and optionally one or more fillers selected from the group consisting of polypropylenes, thermoplastic vulcanates (TPV), ethylene propylene diene terpolymers (EPDM), ethylene vinyl acetate (EVA) copolymers, ethylene n-butyl acrylate copolymers, and ethylene methacrylate copolymers; and
 molding the extruded composition into the weatherstrip;
 wherein the polyolefin is selected from the group consisting of a blend of propylene/α-olefin copolymer with an ethylene/α-olefin copolymer, and a propylene/α-olefin copolymer.

3. The method of claim 2, wherein the grafting is performed in a melt.

4. The method of claim 2, wherein the grafting is performed in solution.

5. The method of claim 2, wherein the grafting is performed in a solid-state.

6. The method of claim 2, wherein the grafting is performed in a swollen-state.

7. The method of claim 2, wherein the composition further comprises:
 one or more fillers selected from the group consisting of antistatic agents, dyes, pigments, UV light absorbers, nucleating agents, fillers, slip agents, plasticizers, fire retardants, lubricants, processing aides, smoke inhibitors, anti-blocking agents, and viscosity control agents.

8. The method of claim 2, wherein the weatherstrip is selected from the group consisting of a static seal, a dynamic seal, a sunroof seal, a mirror seal, body-panel interface seal, a stationary window molding, a cut-line seal, a rocker seal, a margin seal, an edge protector seal, and combinations thereof.

9. The method of claim 2, wherein the weatherstrip is a static seal.

10. The method of claim 2, wherein the weatherstrip is a dynamic seal.

11. The method of claim 2, wherein the weatherstrip is a sunroof seal.

12. A weatherstrip comprising:
 a weatherstrip composition that comprises:
  a silane-grafted polyolefin having a density of from about 0.84 g/cm³ to about 0.96 g/cm³,
  wherein the polyolefin is a blend of propylene/α-olefin copolymer and an ethylene/α-olefin copolymer.

13. The weatherstrip of claim 12, wherein the weatherstrip further comprises:
 one or more additives selected from the group consisting of polypropylenes, thermoplastic vulcanates (TPV), ethylene propylene diene terpolymers (EPDM), ethylene vinyl acetate (EVA) copolymers, ethylene n-butyl acrylate copolymers, and ethylene methacrylate copolymers.

14. The weatherstrip of claim 12, wherein the weatherstrip further comprises:
 one or more additives selected from the group consisting of antistatic agents, dyes, pigments, UV light absorbers, nucleating agents, fillers, slip agents, plasticizers, fire retardants, lubricants, processing aides, smoke inhibitors, anti-blocking agents, and viscosity control agents.

15. The weatherstrip of claim 12, wherein the weatherstrip further comprises:
 one or more fillers selected from the group consisting of metal oxides, metal hydroxides, metal carbonates, metal sulfates, metal silicates, clays, talcs, carbon black, and silicas.

16. The weatherstrip of claim 15 wherein the one or more fillers are present in an amount from about 1 wt % to about 20 wt %.

17. The weatherstrip of claim 12, wherein the weatherstrip further comprises:
 one or more tackifying resins selected from the group consisting of aliphatic hydrocarbons, aromatic hydrocarbons, modified hydrocarbons, terpenes, modified terpenes, hydrogenated terpenes, rosins, hydrogenated rosins, and combinations thereof.

18. The weatherstrip of claim 12, wherein the weatherstrip is selected from the group consisting of a static seal, a dynamic seal, a sunroof seal, a mirror seal, body-panel interface seal, a stationary window molding, a cut-line seal, a rocker seal, a margin seal, an edge protector seal, and combinations thereof.

19. The weatherstrip of claim 12, wherein the weatherstrip is a static seal.

20. The weatherstrip of claim 12, wherein the weatherstrip is a dynamic seal.

\* \* \* \* \*